United States Patent [19]

Smid

[11] Patent Number: 5,157,095
[45] Date of Patent: Oct. 20, 1992

[54] HYDROSILYLATION OF UNSATURATED ALIPHATIC ISOCYANATES

[75] Inventor: Johannes Smid, Lafayette, N.Y.

[73] Assignee: The Research Foundation of State University of New York, Albany, N.Y.

[21] Appl. No.: 722,079

[22] Filed: Jun. 27, 1991

Related U.S. Application Data

[63] Continuation of Ser. No. 434,760, Nov. 9, 1989, abandoned.

[51] Int. Cl.$^5$ .............................................. C08G 77/06
[52] U.S. Cl. ...................... 528/15; 528/28; 528/31; 556/114
[58] Field of Search ................... 556/114; 528/15, 28, 528/31

[56] References Cited

U.S. PATENT DOCUMENTS 2,823,218  2/1958  Speier et al. .......................... 528/15
2,970,150  1/1961  Bailey ................................... 528/15

*Primary Examiner*—Melvyn I. Marquis

[57] ABSTRACT

Disclosed herein are novel polyorganosiloxanes, both linear and cyclic, having pendant thereon isocyanate groups derived from specific $\alpha,\alpha$-dimethyl isopropenyl benzyl isocyanates. Also disclosed is a method for production of said polyorganosiloxanes.

The disclosed polyorganosiloxanes are useful as crosslinking agents and as intermediates in the production of star polymers, starburst dendrimers, urethanes and ureas.

10 Claims, No Drawings

1

HYDROSILYLATION OF UNSATURATED ALIPHATIC ISOCYANATES

CROSS REFERENCE TO RELATED APPLICATIONS

This patent application is a continuation of U.S. Ser. No. 07/434,760, filed Nov. 9, 1989, now abandoned.

FIELD OF THE INVENTION

This invention relates to novel polyorganosiloxanes having pendant thereon aliphatic isocyanate groups and a process for their production.

DESCRIPTION OF THE PRIOR ART

Silicone-based materials are widely employed today as specialty coatings, elastomers, films, membranes, adhesives and coupling agents. Silicone-based materials, such as polysiloxanes offer unique properties such as high oxygen permeability, lubricity and low surface tension compared to conventional carbonaceous materials. There is therefore a continuous interest in finding effective ways to combine the advantageous properties of silicone-based materials in applications where heretofore carbonaceous materials were employed.

Isocyanate organosilanes containing single functional isocyanate groups are known, such as through the disclosure of U.S. Pat. No. 4,736,046 wherein beta-isocyanatoethoxysilanes are disclosed. However, these monosubstituted nonpolymeric materials are ineffective for uses such as crosslinking or polymer chain extension, and thus do not effectively allow for the incorporation of the properties of silicones into these areas of usage.

The present invention is directed to novel polyorganosiloxanes having pendant therefrom specific isocyanate moieties. The present invention is further directed to, in a preferred embodiment thereof, to di-, tri- and polyisocyanate compounds which may be utilized in the above-mentioned functions.

SUMMARY OF THE INVENTION

The present invention is directed to a polyorganosiloxane of the following nominal formula.

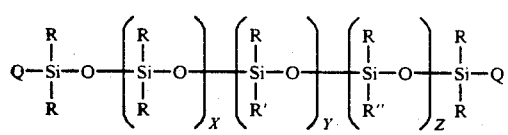
(I)

wherein
R, which may be the same or different, represents an alkyl group having from 1 to about 8 carbon atoms;
R' represents hydrogen;
R" represents the group

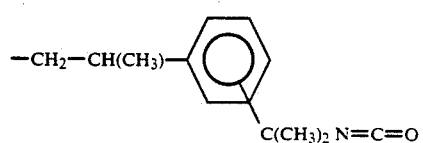

Q represents either R or hydrogen;
X is an integer having a value ranging from 0 to about 200;
Y is an integer having a value ranging from 0 to about 200; and
Z is an integer having a value ranging from 1 to about 200; with the proviso that Q is hydrogen if Y is zero.

In a preferred embodiment thereof, the present invention further relates to a cyclic polyorganosiloxane having the following nominal formula.

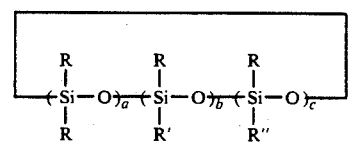
(II)

wherein R, R', and R" have values as set forth above;
a is an integer having value a ranging from 0 to about 10;
b is an integer having a value ranging from 0 to about 10; and
c is an integer having a value ranging from 1 to about 10, with the proviso that Q is hydrogen if Y is zero.

The present invention further relates to a process for the production of the compounds identified in Formulae I and II above.

DETAILED DESCRIPTION OF THE INVENTION

The present invention relates to the production of polyorganosiloxanes, both linear and cyclical, having at least one aliphatic isocyanate group pendant thereon. The present invention further relates to a process for the production of said polyorganosiloxanes.

The polyorganosiloxanes produced in the practice of the present invention have the following nominal formula.

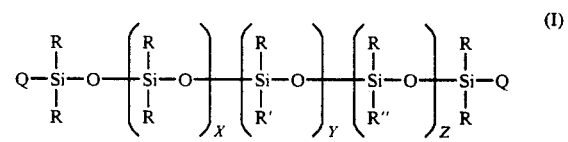
(I)

wherein
R, which may be the same or different, represents an alkyl group having from about 1 to about 8 carbon atoms;
R' represents hydrogen;
R" represents the group

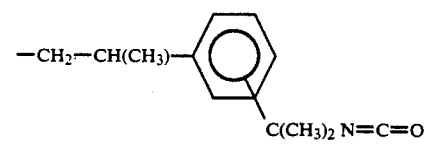

Q represents either R or H;
X is an integer having a value ranging from about 0 to about 200;
Y is an integer having a value ranging from about 0 to about 200; and
Z is an integer having a value ranging from about 1 to about 200, with the proviso that Q is hydrogen if Y is zero.

Preferably, R, which may be same or different, represents an alkyl group having 1 to about 4 carbon atoms;

R" is either a, a' - dimethyl meta-or para-isopropenyl benzyl isocyanate

Q is R;

X is an integer having a value ranging from 0 to about 50;

Y is an integer having a value ranging from 0 to about 50; and

Z is an integer having a value ranging from 1 to about 50.

Further, the sum of X, Y and Z preferably ranges from 2 to about 50.

Most preferably, R represents a methyl group;

R" is derived from a, a' - dimethyl meta-isopropenyl benzyl isocyanate;

X is an integer having a value ranging from 0 to about 20;

Y is an integer having a value ranging from 0 to about 20;

Z is an integer having a value ranging from 2 to about 20; and the sum of X, Y and Z is no greater than 20.

The polyorganosiloxanes of the present invention can be prepared by means well known to those skilled in silicone chemistry. For example, the precursor of the polyorganosiloxanes of this invention, have the nominal formula:

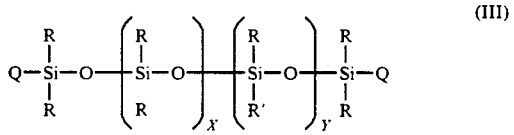

(III)

wherein the variables are as previously defined with the proviso that Q is hydrogen if Y is zero. These compounds can be conveniently prepared by reacting a mixture containing hexamethyldisiloxane, octamethylcyclotetrasiloxane, trimethyl end blocked methyl hydrogen polysiloxane and an acid catalyst. The number of repeating units can be varied, as desired, by varying the mole ratio of the reactants. A specific procedure for preparing compounds falling within the scope of the Formula (III) is set forth in Example 2 of U.S. Pat. No. 4,046,930 granted Sep. 6, 1977.

Compounds of Formula III are then reacted with α,α-dimethyl meta or para-isopropenyl benzyl isocyanate. The meta isomer is commercially available from American Cyanamid Company which markets it under the trademark of m-TMI (which designation will be used hereinafter to refer to this reactant and to describe the remaining aspects of the invention). Preferably, m-TMI is purified prior to its reaction with the reactant of Formula III. This may be accomplished for example through vacuum distillation under an inert gas, such as nitrogen.

The molar amount of m-TMI introduced to form the reaction mixture with Compound III depends upon the degree of reaction over the Si—H linkage sought and can readily be adjusted accordingly by one of average skill in the art. If complete reaction of all Si—H linkages is desired, excess m-TMI should be introduced and any excess can be readily removed from the resulting product mixture.

The reaction of m-TMI and the Compound III is conducted at a reaction temperature of from about 20 to about 120° C., preferably about 25° to about 80° C., in the presence of a catalyst to induce reaction of the double bond present on m-TMI with the Si—H linkage in Compound III. Among the catalysts generally useful in the reaction are compounds of a platinum group metal, especially platinum-olefin complex catalysts such as those disclosed in U.S. Pat. Nos. 3,159,601; 3,159,662;3,220,972;3,775,452 and 4,808,634, the contents of which are hereby incorporated by reference. The preferred platinum group metals are platinum and rhodium, although ruthenium-based catalysts may also be employed. Specific catalysts useful in the practice of the present invention include chloroplatinic acid, endocyclopentadiene platinum and platinum divinyl tetramethyldisiloxane.

The catalyst (calculated as the weight of metal) should be present in the reaction mixture in quantities ranging from about 1 to about 250 ppm, based on the weight of the polyorganosiloxane reactant. The catalyst may be present in greater amounts although this is generally uneconomical and leads to coloration of the final product which is often undesirable. Preferably, the catalyst is present in amounts ranging from about 5 to about 100 ppm on the same basis.

Reaction times will very according to reaction temperature and catalyst content and may range up to 50 hours in order to completely react the Si—H linkages although reaction times of 6 to 24 hours are preferred. Additional catalyst may be introduced into the reaction mixture during the course of the reaction to aid in its completion.

The reaction is then carried out through the maintenance of the above described reaction temperature until the reaction proceeds to the desired degree. This can be determined by measuring the presence of Si—H linkages through such means as $^1$H-NMR. Any m-TMI present upon reaction completion can be removed such as by the application of high vacuum and elevated temperature, thereby isolating the final product, Compound I. Compounds of Formula II may be prepared in a similar fashion to that above except that a cyclic siloxane reactant is initially substituted for Compound III.

Cyclic siloxanes are commercially available to use in the production of compounds of Formula II. Preferred in the practice of this aspect of the present invention are cyclic siloxanes wherein the sum of a, b and c is no greater than 10. Most preferably, the sum of a, b and c does not exceed 6. Especially useful in the practice of this embodiment of the present invention is tetramethylcyclotetrasiloxane. Compounds of Formula II may further be converted to acyclic molecules through treatment with base.

In addition to the above-described polyorganosiloxane reactants, other organo-hydrosilane oligermers, polymers and copolymers should be useful in the practice of the present invention. These include 1,1,3,3-tetramethyldisiloxane.

The products of the present invention are useful as precursors for star polymers or starburst dendrimers or as crosslinking agents. Further, the compounds claimed herein can be further reacted with agents reactive with the aliphatic isocyanate moiety pendant thereon. For example, dialkanol amine may be reacted with a compound within Formula II via its amine group to yield a polyol useful in the production of starburst polymers such as those which are generally disclosed in *Macromolecules* 19, p. 2466 (1988). Reactions with polyalkylene glycols and diamines produce network polymers having urethane and urea linkages, respectively.

Whereas the scope of the instant invention is set forth in the appended claims, the following specific examples are provided to further illustrate certain aspect of the present invention. These examples are set forth for illustration only and are not to be construed as limitations on the present invention. All parts and percentages are by weight unless otherwise specified.

EXAMPLE

The isocyanate m-TMI(100 grams) was vacuum distilled under a slow flow of nitrogen. The fraction boiling at 127°–128° C./12.7 mm Hg was then collected for use in the hydrosilation reaction.

Tetramethylcyclotetrasiloxane (10.grams, 0.0395 moles) was mixed with the freshly distilled m-TMI (50 grams, 0.2488 moles) in a three neck flask. To the resulting clear solution was added 0.3 ml of a 3% solution of platinum divinyltetramethyldisiloxane in xylene. The mixture was then heated under nitrogen at 40° C. The reaction was continued until no SiH absorption could be detected in the ¹H-NMR spectrum. Total reaction time was 30-40 hours. In the latter stages of the reaction, a small quantity of fresh catalyst was added to complete the reaction. Excess m-TMI was removed under high vacuum at a temperature of about 120° C.

The product, a slightly colored viscous liquid was analyzed by IR, NMR, gel permeation chromatography and elemental analysis, the results of which are set forth below. ¹HNMR (CDCl₃)W-0.90(Si—CH₃,s,3); 0.93(Si-—CH₂,d,2); 1.30 (CH—CH₃,d3); 1.69 (C—CH₃,s,6); 2.95 (CH,m,1); 7.10 (arom CH,s,1); 7.30 (arom CH,m,3). ¹³C NMR (CDCl₃), w, 1.51 (SiCH₃); 25.55 (CH₃); 27.22 (Si—CH₂); 33.10 (C—CH₃); 35.35 (CH); 60.77 (C—N); 121.82, 122.75, 125.30, 128,53 (arom C); 123.27 (C=O). Anal. Calc., C 64.33; H 7.33; N 5.35. Found, C 64.02; H 7.34; N 5.30.

The absence of a SI—H absorption in the ¹ H NMR spectrum of tetra[2-methyl-2{3-(1-isocyanato-1-methylethyl) phenyl}ethyl]tetramethyl cylcotetrasiloxane, (abbreviated as D4TMI) and represented schematically below, suggests complete substitution of the silanic hydrogen by m-TMI. This was confirmed by the results of elemental analysis and by GPC. The gel permeation chromatogram depicted only one sharp peak with a very small shoulder on the higher molecular weight side. The latter may result from the reaction of m-TMI with pentamethylcyclotetrasiloxane, a likely impurity in tetramethylcyclotetrasiloxane which typically has a purity of about 95%. The ¹³C NMR spectrum only showed the expected carbon absorptions. From all observations, it appeared that the conversion to the tetrafunctional aliphatic isocyanate D4TMI is quantitative. The color of the product is believed to be due to the presence of the platinum catalyst which may be removed through the application of such treatments as contact with activated charcoal.

EXAMPLE 2

The procedure of Example 1 is followed except that the polyorganosiloxane reactant was replaced with polymethylhydrodimethylsiloxane. A small amount of toluene was further added to lower the viscosity of the reaction mixture. The resulting product is a linear polysiloxane containing pendant aliphatic isocyanate groups.

I claim:

1. A polyorganosiloxane of the formula

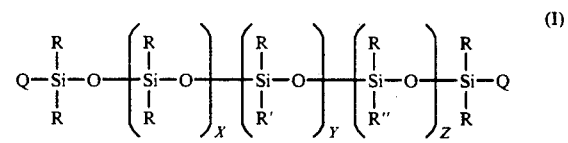

wherein

R, which may be the same or different, represents an alkyl group having from 1 to about 8 carbon atoms;

R' represents hydrogen;

R" represents the group

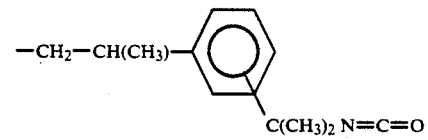

Q represents either R or hydrogen;

X is an integer having a value ranging from 0 to about 200;

Y is an integer having a value ranging from 0 to about 200; and

Z is an integer having a value ranging from 1 to about 200;

with the proviso that Q is hydrogen if Y is zero.

2. The polyorganosiloxane of claim 1 wherein R is an alkyl group having from 1 to about 4 carbon atoms, R" is

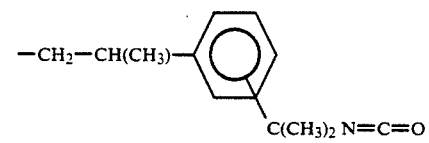

X and Y have values of 0 to about 50, Z has a value of from 1 to about 50 and the sum of X, Y and Z ranges from 2 to about 50.

3. The polyorganosiloxane of claim 2 wherein X and Y have values of from 0 to about 20, Z has a value of 2 to about 20, and the sum of X, Y and Z ranges from 2 to about 50.

4. A polyorganosiloxane of the formula

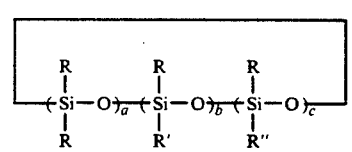

wherein

R, which may be the same or different, represents an alkyl group having from 1 to about 8 carbon atoms;

R' represents hydrogen;

R" represents the group

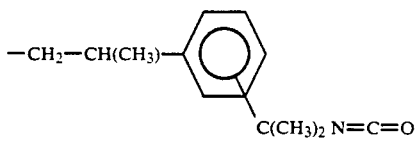

a is an integer having value a ranging from 0 to about 10;

b is an integer having a value ranging from 0 to about 10; and c is an integer having a value ranging from 1 to about 10, with the proviso that the sum of a, b and c is at least 4.

5. The polyorganosiloxane of claim 4 wherein R is an alkyl group having from 1 to about 4 carbon atoms, R" is

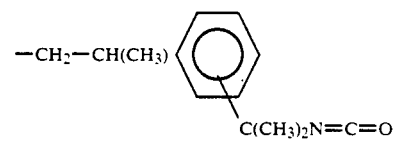

and the sum of a, b and c is not greater than 10.

6. The polyorganosiloxane of claim 5 wherein the sum of a, b and c is not greater than 6.

7. The polyorganosiloxane of claim 6 wherein a and b are zero and c equals 4.

8. A polyorganosiloxane of the formula

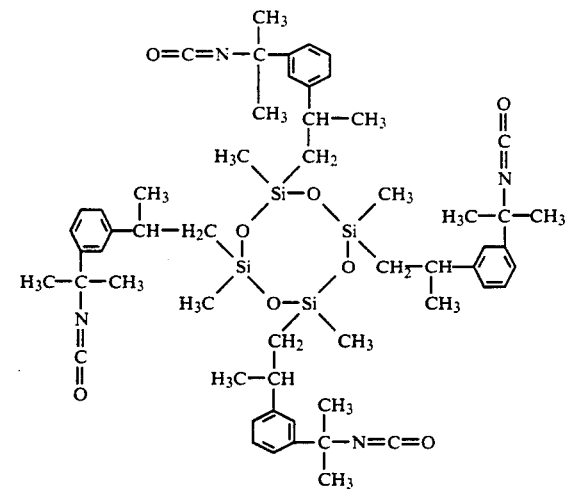

9. A process for the production of a polyorganosiloxane of Formula I comprising reacting a compound of the formula

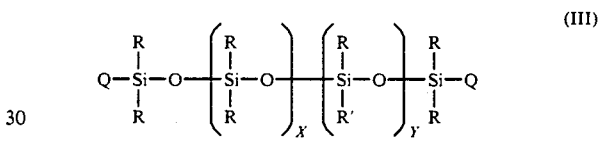

wherein R, which may be the same or different, is an alkyl group having from 1 to about 8 carbon atoms, R' represents hydrogen, Q represents either R or hydrogen, X is an integer having a value ranging from 0 to about 200; Y is an integer having a value ranging from 0 to 200, with the proviso that Q is hydrogen if Y is zero, with an aliphatic isocyanate selected from the group consisting of α,α-dimethyl meta-isopropenyl benzyl isocyanate and α,α-dimethyl para-isopropenyl benzyl isocyanate at the temperature of from about 20° C. to about 120° C. in the presence of an effective amount of a catalyst to induce hydrosilylation.

10. The process of claim 9 wherein the isocyanate is α,α-dimethyl meta-isopropenyl benzyl isocyanate.

* * * * *